United States Patent
Scott et al.

(10) Patent No.: US 10,637,793 B1
(45) Date of Patent: Apr. 28, 2020

(54) CAPACITY BASED LICENSING

(71) Applicant: EMC Corporation, Hopkinton, MA (US)

(72) Inventors: Derek M. Scott, Raleigh, NC (US); Gajanan S. Natu, Cary, NC (US); Michael L. Burriss, Raleigh, NC (US); Alexander Yurievich Burmak, Saint-Petersburg (RU); George Papadopoulos, Franklin, MA (US); Rahul D. Pradhan, Clinton, MA (US); Wai C. Yim, Merrimack, NH (US)

(73) Assignee: EMC IP Holding Company LLC, Hopkinton, MA (US)

( * ) Notice: Subject to any disclaimer, the term of this patent is extended or adjusted under 35 U.S.C. 154(b) by 502 days.

(21) Appl. No.: 15/198,576

(22) Filed: Jun. 30, 2016

(51) Int. Cl.
*H04L 12/911* (2013.01)
*H04L 29/08* (2006.01)
*H04L 12/26* (2006.01)

(52) U.S. Cl.
CPC .......... *H04L 47/70* (2013.01); *H04L 43/0876* (2013.01); *H04L 67/10* (2013.01)

(58) Field of Classification Search
CPC ...... G06F 21/10; G06F 21/105; G06F 21/121; G06F 2221/2137; G06F 2221/2135; G06F 9/468; H04L 63/10; H04L 47/70; H04L 43/0876; H04L 67/10
USPC .......................................................... 705/59
See application file for complete search history.

(56) References Cited

U.S. PATENT DOCUMENTS

| | | | | |
|---|---|---|---|---|
| 7,680,742 B1* | 3/2010 | Ackerman | ............ | G06F 21/105 705/59 |
| 8,782,655 B2* | 7/2014 | Blanding | .............. | G06F 9/5044 718/104 |
| 2002/0107810 A1* | 8/2002 | Nishio | ..................... | G06F 21/80 705/59 |
| 2006/0112182 A1* | 5/2006 | Chen | ....................... | H04L 67/20 709/229 |
| 2008/0313639 A1* | 12/2008 | Kumar | .................. | G06F 9/4881 718/104 |
| 2011/0296429 A1* | 12/2011 | Segmuller | ............. | G06F 21/105 718/104 |
| 2017/0235653 A1* | 8/2017 | Arikatla | .............. | G06F 11/1484 714/4.11 |

* cited by examiner

*Primary Examiner* — Chris Parry
*Assistant Examiner* — Abderrahmen Chouat
(74) *Attorney, Agent, or Firm* — Muirhead and Saturnelli, LLC

(57) ABSTRACT

Described are licensing techniques that may include: receiving a license specifying a maximum limit of a resource where the maximum limit denotes a maximum allowable consumption amount of the resource; providing the maximum limit to one or more software components; and enforcing, by the one or more software components, consumption of the maximum limit of the resource whereby an actual amount of the resource consumed is not allowed to exceed the maximum limit. The maximum limit may be a maximum storage capacity limit in connection with a virtualized storage system or appliance as well as a non-virtualized storage system or appliance. Software components may enforce the maximum limit, or a dependent limit derived therefrom, on the control path and data path. Limits specified in the license, or a dependent limit determined therefrom, may denote a maximum or minimum limit.

16 Claims, 3 Drawing Sheets

CAPACITY BASED LICENSING

BACKGROUND

Technical Field

This application generally relates to licensing.

Description of Related Art

Systems may include different resources used by one or more host processors. Resources and host processors in the system may be interconnected by one or more communication connections, such as network connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may perform basic system I/O (input/output) operations in connection with data requests, such as data read and write operations.

Host systems may store and retrieve data using a data storage system containing a plurality of host interface units, disk drives (or more generally storage devices), and disk interface units. Such data storage systems are provided, for example, by EMC Corporation of Hopkinton, Mass. The host systems access the storage devices through a plurality of channels provided therewith. Host systems provide data and access control information through the channels to a storage device of the data storage system and data of the storage device is also provided from the data storage system to the host systems also through the channels. The host systems do not address the disk drives of the data storage system directly, but rather, access what appears to the host systems as a plurality of files, objects, logical units, logical devices or logical volumes. These may or may not correspond to the actual physical drives. Allowing multiple host systems to access the single data storage system allows the host systems to share data stored therein.

SUMMARY OF THE INVENTION

In accordance with one aspect of the techniques herein is a method of licensing comprising: receiving a license specifying a maximum limit of a resource, said maximum limit denoting a maximum allowable consumption amount of the resource; providing the maximum limit to one or more software components; and enforcing, by the one or more software components, consumption of the maximum limit of the resource whereby an actual amount of the resource consumed is not allowed to exceed the maximum limit. The resource may be a system resource of any of a data storage system and data storage appliance. The data storage system and/or data storage appliance may be virtualized whereby code portions of a control path and a data path are executed in a context of a virtual machine. The resource may be included in, or accessible to, a system providing a virtualized environment including the virtual machine. The resource may be any of storage capacity, processors, and memory. The resource may be storage capacity and the method may include: determining a set of one or more dependent limits, wherein each dependent limit of the set specifies an allowable amount for any of a physical entity and a logical entity, and said each dependent limit of the set is derived from the maximum limit of the resource; communicating any of the maximum resource limit and at least one dependent limit from the set to at least a first of the one or more software components; and enforcing, by the first software component, the any of the maximum resource limit and the at least one dependent limit from the set. The set of one or more dependent limits may include one or more maximum allowable amounts for any of: maximum size of a file system, maximum size of a logical device, maximum number of snapshots, maximum number of logical devices, maximum size of a storage pool, maximum size of a RAID group, maximum size of a physical storage device, a maximum amount of one of a plurality of storage tiers. The set of one or more dependent limits may include one or more minimum limits for any of: a minimum number of processors, a minimum amount of memory, and a minimum amount of one of a plurality of storage tiers. The first software component may be included in a control path and the any of the maximum resource limit and the at least one dependent limit from the set may be enforced by the first software component in connection with servicing data storage system management requests. The first software component may be used in connection with performing any of: a provisioning operation to provision storage for a logical entity in a data storage system, a data replication operation, a snapshot operation, and a file system operation. The first software component may be included in a data path. The first software component may be a device driver and the method may include: determining, by the device driver, a first device currently having a first state that is any of invalidated and unusable, said first device having an associated first capacity that is not allowed to be used in connection with storage provisioning operations; determining, by the device driver, that the first device has a revised state that is any of validated and usable in accordance with the at least one dependent limit from the set; and permitting the first device to be used in connection with storage provisioning operations. The license may be an upgrade license or a downgrade license with respect to a current license. The current license may indicate a first maximum limit for the resource prior to the upgrade, wherein the first maximum limit may be updated to the maximum limit as a revised maximum limit for the resource.

In accordance with another aspect of techniques herein is a system comprising: a processor; and a memory comprising code stored thereon that, when executed, performs a method of licensing comprising: receiving a license specifying a maximum limit of a resource, said maximum limit denoting a maximum allowable consumption amount of the resource; providing the maximum limit to one or more software components; and enforcing, by the one or more software components, consumption of the maximum limit of the resource whereby an actual amount of the resource consumed is not allowed to exceed the maximum limit.

In accordance with another aspect of techniques herein is a computer readable medium comprising code stored thereon that, when executed performs a method of licensing comprising: receiving a license specifying a maximum limit of a resource, said maximum limit denoting a maximum allowable consumption amount of the resource; providing the maximum limit to one or more software components; and enforcing, by the one or more software components, consumption of the maximum limit of the resource whereby an actual amount of the resource consumed is not allowed to exceed the maximum limit. The resource may be a system resource in any of a data storage system and data storage appliance. The data storage system and/or data storage appliance may be virtualized whereby code portions of a control path and a data path are executed in a context of a virtual machine, and wherein the resource may be any of: included in or accessible to a system providing a virtualized environment including the virtual machine. The resource may be any of: included in or accessible to a system providing a virtualized environment including the virtual machine. The resource may be any of storage capacity, processors, and memory. The resource may be storage capacity and the method may include: determining a set of one or more dependent limits, wherein each dependent limit of the set specifies an allowable amount for any of a physical entity and a logical entity, and said each dependent limit of the set is derived from the maximum limit of the resource; communicating any of the maximum resource limit and at least one dependent limit from the set to at least a first of the one or more software components; and enforcing, by the first software component, the any of the maximum resource limit and the at least one dependent limit from the set. The first software component may be included in a control path. The maximum resource limit and/or the at least one dependent limit from the set may be enforced by the first software component in connection with servicing data storage system management requests. The first software component may be included in a data path.

BRIEF DESCRIPTION OF THE DRAWINGS

Features and advantages of the techniques herein will become more apparent from the following detailed description of exemplary embodiments thereof taken in conjunction with the accompanying drawings in which.

DETAILED DESCRIPTION OF EMBODIMENT(S)

Figure 1:
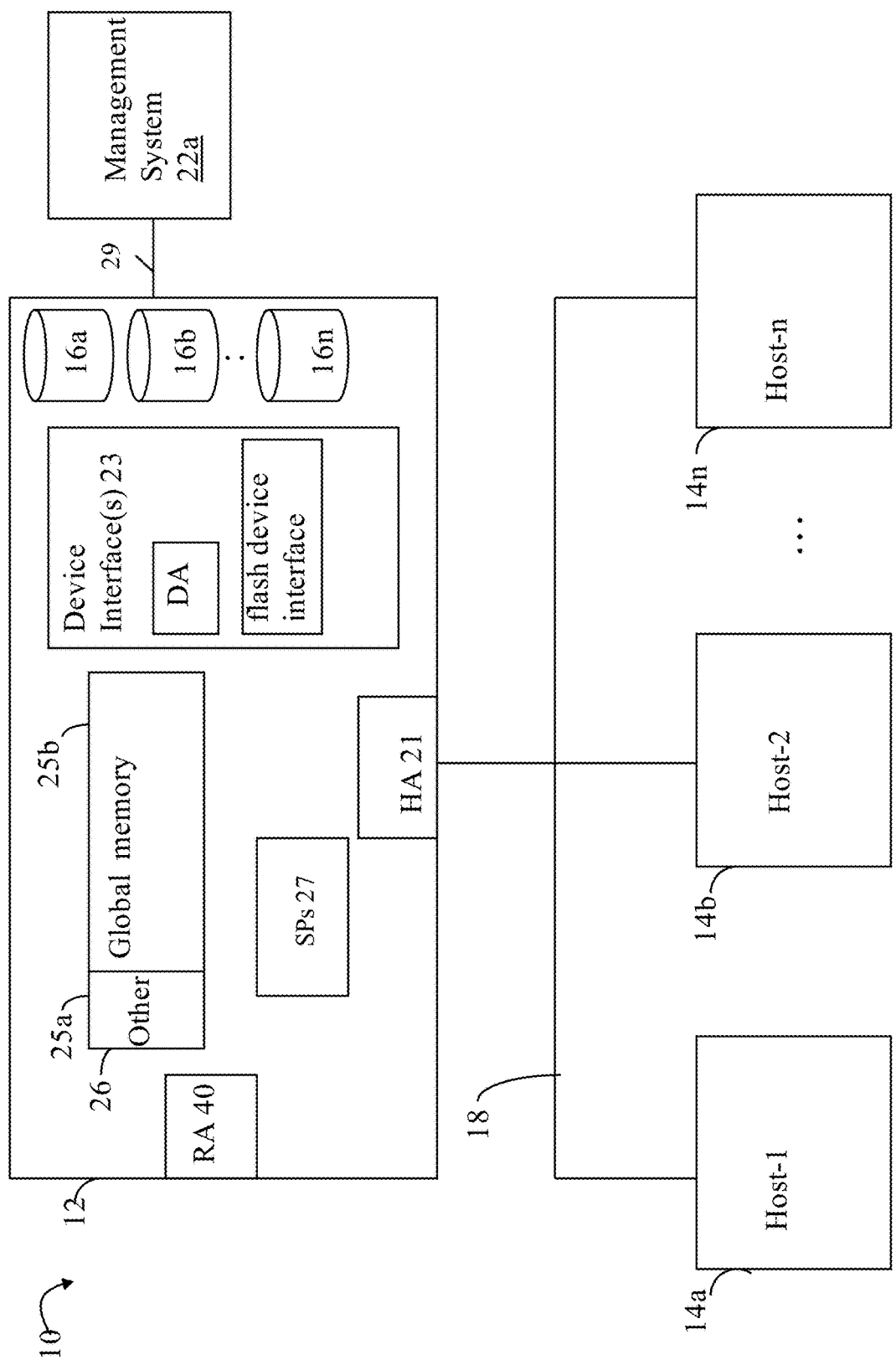
FIGS. 1 and 2 are examples of components that may be included in a system in accordance with techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as block-based protocols (e.g., SCSI, Fibre Channel, iSCSI), file system-based protocols (e.g., NFS), and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage appliance or a data storage array including a plurality of data storage devices 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving mechanical parts. The flash devices may be constructed using nonvolatile semiconductor NAND flash memory. The flash devices may include one or more SLC (single level cell) devices and/or MLC (multi level cell) devices.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

Consistent with other discussion regarding various embodiments of techniques described herein, an embodiment of techniques herein may include a physical data storage system or appliance and its components, as well as a virtualized storage system or appliance (e.g., VSA described elsewhere herein). In connection with an embodiment using techniques herein with a VSA, the physical storage devices such as 16a-n may or may not be contained with a data storage system. For example, in an embodiment using a VSA or virtualized data storage system and components, the physical storage devices 16a-n may include physical storage devices attached to the computer or other system including the processor providing the virtualized environment. For example, with a VSA including a processor executing code that provides a virtualized environment including a virtualized data storage system or appliance, the physical storage devices 16a-n may include network attached storage (NAS) devices as well as other physical storage devices of the system including the foregoing processor. More generally, the physical storage used in connection with techniques herein may include physical storage of a data storage system or appliance, a virtual device (e.g., logical device providing physical storage for use within a virtualized environment such as by a virtual machine as described elsewhere herein), a NAS storage device, and the like. Techniques herein may generally be used in connection with licensing an amount of storage capacity in connection with any suitable logical device and/or physical storage device that may vary with the particular system and environment (e.g., licensing storage capacity in connection with virtual devices in a virtualized environment). Furthermore as described elsewhere herein, such licensing techniques described herein may be generally used in connection with other suitable physical and/or logically defined resources.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN (s) residing thereon. It should be noted that an embodiment may use the same or a different device interface for one or more different types of devices than as described herein.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

Also shown in FIG. 1 is a management system 22a that may be used to manage and monitor the system 12. In one embodiment, the management system 22a may be a computer system which includes data storage system management software or application such as may execute in a web browser. A data storage system manager may, for example, view information about a current data storage configuration such as LUNs, storage pools, and the like, on a user interface (UI) in a display device of the management system 22a. Alternatively, and more generally, the management software may execute on any suitable processor in any suitable system. For example, the data storage system management software may execute on a processor of the data storage system 12.

It should be noted that each of the different adapters, such as HA 21, DA or disk interface, RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16a-16n. In the following description, data residing on a LUN may be accessed by the device interface following a data request in connection with I/O operations that other directors originate. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of FIG. 1 may be a data storage system, such as the VNXe® data storage system by EMC Corporation of Hopkinton, Mass., that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, memory 26 may represent memory of each such storage processor.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receiving a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to FIG. 1, the control commands may be issued from data storage management software executing on management system 22a to the data storage system 12. Such commands may be, for example, to establish or modify data services, provision storage, perform user account management, and the like. For example, commands may be issued over the control path to provision storage for LUNs, create a snapshot, define conditions of when to create another snapshot, delete a snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, with reference to FIG. 1, a data storage system may have a separate physical connection 29 from a management system 22a to the data storage system 12 being managed whereby control commands may be issued over such a physical connection 29. However, it may be that user I/O commands are never issued over such a physical connection 29 provided solely for purposes of connecting the management system to the data storage system. In any case, the data path and control path each define two separate logical flow paths.

In at least one embodiment, techniques herein may be used with a virtual storage appliance (VSA) whereby the data storage system software stack, such as associated with the data path I/O processing and control path processing, runs as a virtual appliance rather than on data storage system hardware. In other words, the data storage system hardware, such as DAs, FAs, and the like, which perform processing in connection with servicing I/O requests (e.g., commands/requests over the data path) and data storage system management requests (e.g., commands/requests over the control path) may be characterized as virtualized by executing the code in the context of a virtual machine (VM) rather than on such data storage system hardware components. The software that typically is executed on hardware of data storage system or storage appliance is executed in the context of one or more VMs to perform such processing for the data path and control path. In such an embodiment, physical storage devices, such as rotating disk drives, flash drives, and other non-volatile storage media may be used as the back-end provisioned physical storage. Thus, techniques described in following paragraphs may be used in one embodiment with a VSA (e.g., virtualized data storage system) along with physical storage devices or PDs. As a variation, such techniques herein may also be used in an embodiment with the data storage system hardware components, such as the DAs, FAs, and the like, along with the PDs where the data storage system is not virtualized (e.g., not a VSA).

In at least one embodiment of techniques herein, a VSA may be used to provide a virtualized VNX® data storage system using virtualization software. In such an embodiment, the VSA may be a VM running on an ESX hypervisor provided by VMware, Inc. Thus, rather than include the various DAs, FAs and other hardware components, software may be run on VMs to provide access and service requests (e.g., of the control and data path) with respect to the underlying physical storage.

Described in following paragraphs are capacity-based licensing techniques. Such techniques may be described for illustrative purposes with a VSA for use in connection storage capacity provided by PDs of a system. However, such techniques are also readily applicable for use in connection with other non-virtualized storage system appliances and environments, such as an embodiment with the data storage system hardware components, such as the DAs, FAs, and the like.

In connection with an embodiment utilizing a VSA, a license may be obtained having an allowable maximum capacity limit. The license is a license for the various management and data storage system services provided in connection with provisioned physical storage up to the specified maximum capacity limit. The system may include any number and actual amount of physical storage. However, the license may only be used in connection with a provisioned amount up to the specified capacity limit. The PDs providing the physical storage may be, for example, any combination of different PD technologies, from one or more different vendors, and having the same or different drive capacities. However, the license and its associated maximum capacity limit denotes that maximum amount of the physical storage that the instance of the licensed VSA may use. In an embodiment having a physical data storage system or appliance (e.g. non-virtualized with no VSA) rather than a virtualized storage system or appliance (e.g., with a VSA), the same maximum capacity limit may apply to the amount of physical storage used by the non-virtualized physical data storage system or appliance. In this manner, the license may be a license for data storage system services, facilities, and features such as, for example, thin or virtual storage provisioning for logical devices, thick or regular logical device storage provisioning, local data replication services (e.g., local mirror, local snapshots), remote data replication services (e.g., remote mirroring), data storage optimizations/optimizers, file systems and file system services, block-based logical device services, and the like.

The foregoing data storage system services, facilities, and features are known in the art. For example, thin or virtual storage provisioning is a logical device having a specified virtual storage capacity where the underlying physical storage is provisioned on demand as needed (e.g., as writes to different portions of the LUN's logical address space are written to). Thin devices and thin provisioning, also referred to respectively as virtually provisioned devices and virtual provisioning, are described in more detail, for example, in U.S. patent application Ser. No. 11/726,831, filed Mar. 23, 2007 (U.S. Patent App. Pub. No. 2009/0070541 A1), AUTOMATED INFORMATION LIFE-CYCLE MANAGEMENT WITH THIN PROVISIONING, Yochai, EMS-147US, and U.S. Pat. No. 7,949,637, Issued May 24, 2011, Storage Management for Fine Grained Tiered Storage with Thin Provisioning, to Burke, both of which are incorporated by reference herein. A snapshot may be characterized as a logical point in time copy of a logical device or other storage entity. A snapshot is not a physical bit for bit copy of a base or primary storage entity, such a LUN, but rather uses a copying technique that stores or tracks differences with respect to the primary storage entity of which a snapshot is taken. A mirror of a storage entity, such as a LUN, may be characterized as a bit for bit physical copy. Different techniques may be used in connection with data replication to make a physical copy of a LUN, as well as maintain the physical copy as a mirror or duplicate of the LUN. An example of a data storage optimizer is the fully automated storage tiering (FAST) product by EMC Corporation. The data storage optimizer, such as the FAST product, provides for automatically storing and moving different data portions of different logical devices among different storage tiers in a data storage system. In an embodiment in accordance with techniques herein, the PD providing the non-volatile back-end storage may include multiple storage tiers each having storage devices of different technologies, different physical capabilities, and characteristics. For example, a first storage tier may include rotating disk drives and a second storage tier may include flash drives. The data storage optimizer may perform processing to monitor the varying I/O workloads of different sub-LUN data portions and automatically perform data movement of such data portions responsive to changing I/O workloads over time (e.g., with the goal of optimizing data storage system performance).

Thus, the license for a specified maximum capacity may be characterized as a license to use various features, facilities and services as noted above. In at least one embodiment, the license may be for all such features rather than have varying charges for different features/per feature. However, it will be appreciated by those skilled in the art that techniques herein may be readily adapted for use in systems which issue licenses for less than all features (e.g., licenses may be per feature, defined groups of features, and the like). In an embodiment using the VSA, the license may be bound or tied to a particular universal unique identifier (UUID) associated with a VSA instance rather than a serial number of a physical data storage system or appliance. However, in an embodiment using a physical data storage system or appliance rather than a VSA, such techniques herein may also be used with a license based on the serial number of the physical storage system or appliance.

In connection with an embodiment using a VSA, a user may first download and install the VSA software to a suitable computer system with PDs. A UUID for the particular VSA instance may be generated, or otherwise obtained, as part of the VSA installation. The user may then obtain a capacity-based license for the VSA based on the VSA's UUID. The particular VSA's UUID may be registered with a license manager server where the license server generates a license file. The user may then install the license file on the system including the VSA. In this manner, the license file may provide the necessary licenses for the particular VSA to use the different data storage system services, facilities and features, some of which are noted above and elsewhere herein. As described in more detail below, the license for the different data storage services and features may be capacity based whereby such services and features may have other allowable maximum limits based on the particular maximum allowable capacity specified by the license. In such an embodiment, the different dependent limits that may be applicable for use with the different data storage system services, facilities and features may also automatically be updated or varies as the maximum allowable capacity limit for the VSA or data storage system may vary. For example, at a first point in time, the maximum allowable storage capacity for the VSA's license may be 10 terabytes (TBs) of physical storage. Thus, for example, the VSA may be allowed to perform storage provisioning for logical devices, storage pool configuration, and the like, subject to the maximum 10 TB limit. The VSA may already have allocated or provisioned storage up to the 10 TB limit. In the system where the VSA is executing there may be additional physical storage device having another 2 TB of storage capacity. However, because the VSA is subject to the 10 TB limits, the additional 2 TB of storage may not be made available for use by the VSA with the 10 TB limit. At a second later point in time, the capacity license for the VSA may be upgraded so that the maximum storage capacity is upgraded, for example, to now have revised maximum capacity limit of 12 TB. In such a case, an embodiment in accordance with techniques herein may automatically provide for upgrading the licensed storage capacity without service disruption. When the new maximum capacity limit of 12 TB is specified with the license upgrade, the new licensed capacity limit of 12 TB may be automatically provided to other software components on the system with the new revised capacity limit of 12 TB available immediately after license upgrade. Processing may automatically be performed to communicate the revised 12 TB limit to different components of the control path and data path. For example, capacity license installation or upgrade to 12 TB may trigger revalidation of unused storage capacity such as the unused 2 TB of physical storage noted above. Responsive to upgrading the licensed storage capacity to 12 TB, the system may now make available, to the VSA system and its user, the additional 2 TB of previously unused storage. In this manner, the user of the VSA may now perform different data storage system operations, such as create storage pools and create logical devices, subject to the new revised 12 TB limit. In such an embodiment, another second dependent limit may be specified for a particular data storage service, facility or feature. For example, there may a maximum number of snapshots allowable for a logical device. If the license for the VSA is upgraded to now have revised maximum capacity limit of 12 TB, the second dependent limit may also be automatically adjusted from the foregoing maximum number of snapshots allowed per logical device to a larger maximum number of snapshots allowed per logical device. In accordance with techniques herein, as the licensed maximum storage capacity increases (or more generally changes or varies), other dependent limits for different storage services, facilities and features may also be accordingly automatically modified. Thus, the new revised dependent limits, along with the revised maximum capacity limit, may be dynamically and automatically updated and take effect immediately after license installation and/or upgrade. The foregoing may be performed in a non-disruptive manner without requiring user interaction and without requiring a system reboot. In a manner similar to a license upgrade, techniques herein may also be applied to a license downgrade with respect to a current license (e.g., where the downgrade may, for example, reduce licensed resource capacity with respect to a current license in contrast to an upgrade which extends resources with respect to a current license). The foregoing and other aspects of techniques herein are described in more detail in following paragraphs.

Figure 2:
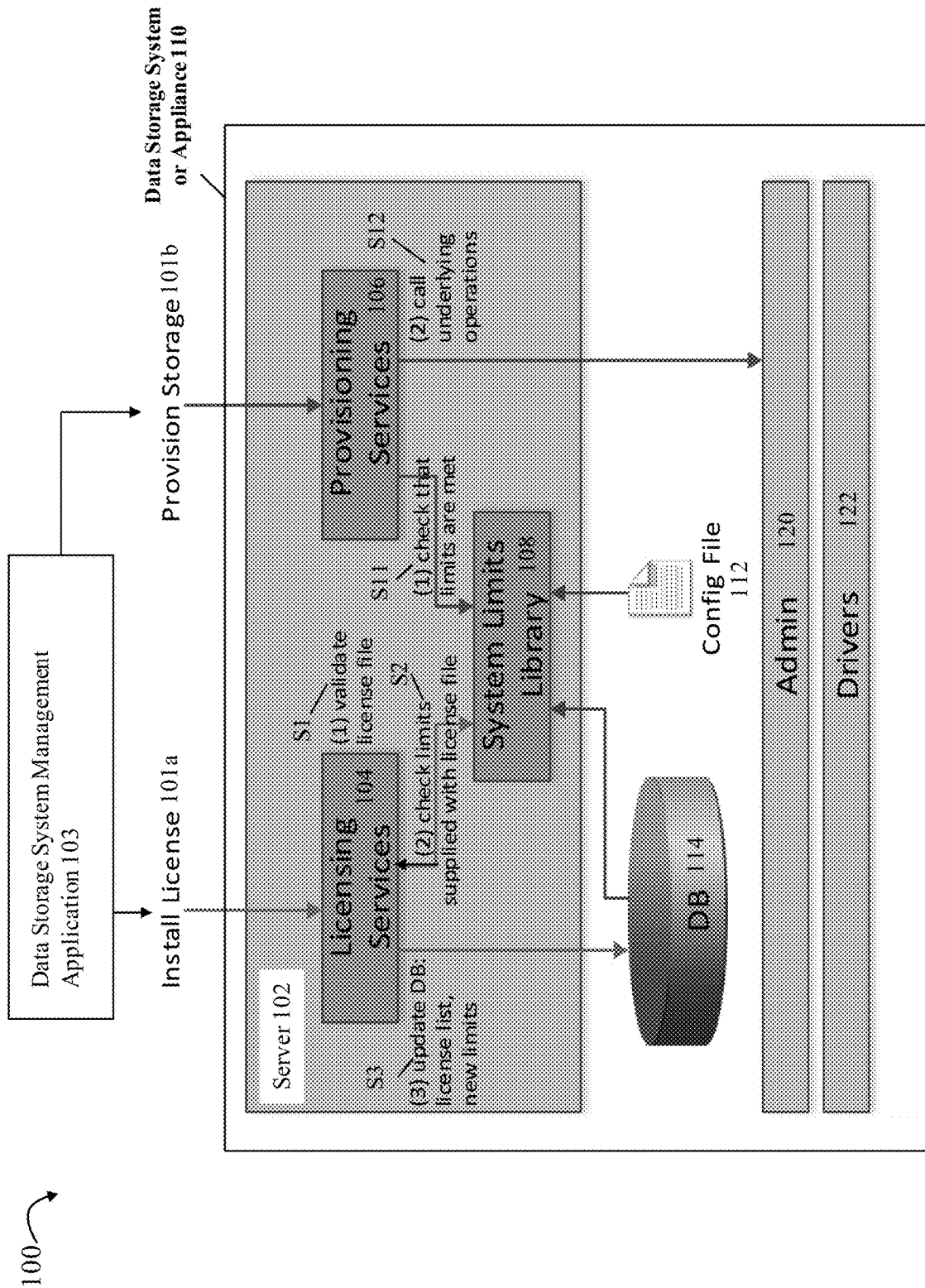

Referring to FIG. 2, shown is an example of components that may be used in an embodiment in accordance with techniques herein. The example 100 includes data storage system management application 103 and a data storage system or appliance 110. The management application 103 may include an interface, such as any one or more of graphical user interface (GUI), command line interface (CLI), and the like, that may be used in connection with a user entering commands or queries in connection with data storage system management operations and tasks. A user of the management application 103 may enter a query or command using the GUI or other interface of the application 103 where the command or query 102 may be communicated, to the data storage system or appliance 110. The data storage system or appliance 110 may be a physical data storage system including PDs as well as other hardware components, such as DAs, FAs and the like, which perform processing in connection with servicing requests over both the data path and control path. As a variation as also described herein, the data storage system or appliance 110 may be a VSA whereby the appliance or system 110 may include PDs providing the back-end non-volatile physical storage. However, consistent with description herein, the VSA may be virtualized in that the code typically executed by the data storage system hardware components (e.g., DAs, FAs) in connection with the control and data paths is now executed in the context of a VM.

In connection with techniques herein, the management application 103 may be used to a install license 101a on the storage system or application 110, which may be implemented as a VSA. The license installation 101a may be performed over the data storage control path as a data storage system management operation. The license installed may be a new license, a license upgrade, or a license downgrade. The license upgrade and downgrade may both be with relative or respect to a current license. The license installed in 101a may be a license file including particulars about the license such as the maximum capacity limit specifying a maximum storage capacity allowed for use by the VSA, as described above and elsewhere herein. The license file may also include other information, for example, such as a license expiration date, UUID of licensed VSA, issuer of the license (e.g., storage vendor or licensing server) and the like. In connection with installing the license, step S1 may be performed to validate the license file. Validation performed in step S1 may include any suitable processing to ensure the license file is valid and authentic. Validation may use, for example, public-key cryptography, or asymmetric cryptography, that uses pairs of keys—a public key and a private key known only to the owner. For example, the license file contents may be hashed using a cryptographic hashing technique, to generate a hash value. The hash value may then be encrypted using the license provider's private key to generate a digital signature. The digital signature and original license file may be sent as a message. The receiver may then perform validation processing that includes decrypting the digital signature using the license provider's public key and thereby generating a decrypted value. The receiver may also perform processing to compute a hash value by applying, to the original license file, the same cryptographic hashing technique used by the license provider. The receiver may then compare the computed hash value with the decrypted value. If the foregoing two values are equal, then validation processing confirms that the original license file is authentic in that it has been sent by the license provider and has not been modified. Validation of step S1 may also include, for example, ensuring that the license file sets forth an expiration date that has not yet expired (e.g., current date is prior to the expiration date). Validation of step S1 may also include, more generally, any suitable processing to validate the license file received.

In step S2, the license file is provided to the system limits library 108 which checks the limits of the supplied license file. The system library 108 may generally be characterized as a control path library that provides an application programming interface (API) that may be invoked by other software components, such as the provisioning services 106, to obtain any desired license limit. Additionally, in step S2, the system limits library 108 may determine any new or revised enforced limit in accordance with a currently enforced limit and any limit provided in the license. An embodiment may specify one or more default limits, such as a default capacity limit. The enforceable capacity limit may be determined by the library 108 as the maximum of the default limit and the maximum capacity limit of the received license. More generally, the library 108 may determine the enforceable capacity limits as the maximum of the default limit and any maximum capacity limits of any one or more valid licenses on the system for the VSA (where the library 108 may also obtain from the database 114 any existing valid licenses and capacity limits applicable for the VSA).

The system limits library 108 may dynamically determine any one or more dependent threshold or limit values based on, or derived from, the enforced maximum storage capacity limit. For example, each dependent threshold or limits may be generally defined as a function of, or using, the specified maximum storage capacity limit. The one or more dependent limit values may include any one or more of the following allowable maximum limits: a maximum allowable size of a provisioned logical device (e.g., which may be equal to the maximum storage capacity limit); a maximum allowable size of a file system (e.g., which may be equal to the maximum storage capacity limit); a maximum number of allowable file systems; a maximum number of snapshots that may exist at any point in time for a single logical storage entity (e.g., maximum number of snapshots per file, file system, logical device which may increase as the maximum storage capacity limit increases); a maximum number of logical devices (e.g., which may increase as the maximum storage capacity limit increases); and a maximum size of a storage pool or RAID group (e.g., which may be the maximum storage capacity limit).

The one or more dependent threshold limit values may also include one or more values each denoting a maximum amount of storage that may be consumed from a different tiers. For example, consistent with discussion elsewhere herein, an embodiment may include multiple storage tiers. Each storage tier may include storage devices of a different technology or type having different performance capabilities. For example, an embodiment may include a first highest performance storage tier of flash PDs, a second mid performance storage tier including rotating disk drives (e.g., 15K RPM drives), and a third lowest performance storage tier of rotating disk drives (e.g., 8K or 10K RPM drivers). The foregoing 3 storage tiers may be ranked, in terms of performance capabilities from highest to lowest, as first tier, second tier, and third tier. For a particular maximum storage capacity limit, a dependent threshold limit may denote a maximum amount of any of the storage tiers allowed to be consumed or used by the VSA (e.g., a first dependent threshold limit may denote a maximum amount of the first storage tier allowed to be consumed or used by the VSA, and a second dependent threshold limit may denote a maximum amount of the second storage tier allowed to be consumed or used by the VSA). The amount of the dependent threshold limit, for example, of the first flash storage tier may be expressed as a percentage value relative to the maximum storage capacity limit.

The one or more dependent threshold limit values may also include one or more values each denoting a minimum amount of another resource that must be allocated for use by the VSA (e.g., or installed and allocated for use in a physical non-virtualized data storage system or appliance). For example, as the maximum storage capacity limit increases, a dependent threshold may denote a minimum amount of flash storage or another storage tier that must be allocated or licensed for use by the VSA. In a non-virtualized data storage system or appliance, the minimum amount of flash or other storage tier may denote the minimum amount of capacity that must exist in the data storage system tier configuration. Thus, as the maximum storage capacity limit increases, dependent threshold amounts denoting minimum amounts of different storage tiers may also increase. The minimum amount denoted by the dependent threshold may be determined as a percentage of the maximum storage capacity limit. In such an embodiment, even if the percentage does not change with maximum storage capacity limit, the dynamically determined numeric value computed for the minimum tier quantity changes relative to the maximum storage capacity limit (e.g., dependent threshold limit for storage tier may be 10% of the maximum storage capacity limit).

The one or more dependent threshold limit values may also include one or more values each denoting a minimum limit of another resource, such as a minimum number of processors or a minimum amount of memory. For a VSA, as the maximum storage capacity limit for the VSA increases, a dependent threshold limit may provide for accordingly increasing the minimum number of processors required in a configuration to be allocated for the VSA. For a VSA, as the maximum storage capacity limit for the VSA increases, a dependent threshold limit may provide for accordingly increasing the minimum amount of memory required in a configuration to be allocated for the VSA. In a non-virtualized data storage system or appliance, a dependent threshold limit for a minimum number of processors or a minimum amount of memory may denote the minimum amount required in the physical data storage system configuration.

In connection with a dependent threshold limit that may specify minimum threshold limit for a resource such as a minimum amount/number of processors or memory, in order for the license upgrade to proceed such as to a revised larger maximum storage capacity limit, the additional requirement of the minimum threshold limit must be met. Otherwise, an embodiment may not update the maximum storage capacity limit to the revised larger maximum storage capacity limit.

Thus, generally, in step S2, the system limits library 108 may determine one or more enforceable limits including the maximum storage capacity limit and any one or more other dependent resource limits (e.g., which may include maximum and/or minimum allowable limits). The system limits library 108 may communicate the current enforceable limit (s) to the licensing services 104. In step S3, the licensing services 104 may update the database 114 with the current license information. Additionally, the database 114 may also be updated to include the current enforceable limits which may include new or revised limits, such as a new or revised maximum capacity storage limit in connection with a license upgrade. For example, at a first point in time, the maximum storage capacity limit may be 4 TB. A license upgrade may be purchased which increases the maximum storage capacity limit to 10 TB. Dependent threshold limits may be dynamically determined for a minimum number of required processors and a minimum amount of memory required. Thus, in order for the enforceable maximum storage capacity limit to be increased from 4 TB to 10 TB, the VSA may be required to have allocated to it at least the specified minimum number of required processors and at least the minimum amount of memory as denoted by the dependent threshold limits; otherwise the enforceable maximum storage capacity limit may be increased/may remain at 4 TB.

Different software components or services may invoke an API of the system limits library 108 to obtain one or more currently enforced limits, such as the maximum capacity storage limit, the maximum size limit for a provisioned logical device or other logical storage entity, and the like. For example, a storage management request may be issued from the management application 103 to provision storage 101b, such provision storage for a LUN or other logical storage entity. The provisioning request 101b may be received at the provisioning services 106 which may perform step S11. In step S11, the provisioning services 106 may issue an API call to the system limits library 108 to obtain a currently enforced provisioning limit. For example, assume the request 101b is a request to provision storage for a logical device. The provisioning services may obtain one or more applicable limits for the provisioning request from the library 108. In connection with a request to provision storage for a logical device, the limits obtained in S11 from the library 108 may include a maximum size or capacity limit allowable for a single logical device, the maximum number of logical devices that are allowed to be allocated or provisioned, and the maximum storage capacity limit. The provisioning services 106 may ensure that the new logical device provisioned by the current provisioning request 101b does not exceed the specified maximum size or capacity limit allowable for a single logical device. The provisioning services 106 may ensure that the new logical device provisioned does not cause the total number of currently provisioned logical devices to exceed the maximum number of logical devices that are allowed. The provisioning services 106 may ensure that the total amount of storage capacity provisioned for the logical devices does not exceed the maximum storage capacity limit.

The request to provision storage 101b may occur over the control path whereby any updated enforced limits, such as an updated maximum storage capacity limit, may be communicated to the data path from the control path, such as illustrated by step S12. In step S12, the control path internally communicates with one or more other software components, such as the admin (administrative) layer 120 and the drivers layer 122, where such other software components may be included in the data path, such as when processing an I/O operation.

More generally, upon capacity license installation, the new licensed limits may be passed to one or more other software components of the system, such as one or more components of the control path (e.g., the system limits library 108 and/or the provisioning services 106 as well as any other service such as related to replication services, snapshot services, data storage optimization, and the like) and one or more components of the data path. The new limits may be provided to the different components of the system in any suitable manner. As illustrated in the example 100, the limits may be provided to other components using the system limits library 108 by having a component invoke an API exposing such limits through return values of the API call. It should be noted although the example 100 illustrates services 104 and 106, the one or more limits may be communicated to other software components or services not illustrated explicitly. For example, an embodiment may include other data storage system services, facilities, and features, such as snapshot services, replication services, data storage optimizations, and the like. Each such service, facility or feature may include a software component that obtains and uses in processing the enforced limits such as in a manner similar to that as described above for the provisioning services 106 (e.g., may invoke an API to obtain the enforced limit and may possibly communicate the limits to one or more software components on the control path and/or data path).

Techniques herein may provide for enforcing the one or limits, such as the maximum storage capacity limit, on both the control path and the data path. For example, as noted above, provisioning storage request 101b may be issued and enforced by provisioning services 106 on the control path. The one or more limits, such as the maximum capacity storage limit, may be communicated in step S12 also described above to a driver 122 on the data path. The driver 122 on the data path may also enforce the one or more limits. When the maximum capacity storage limit is revised to a larger amount, processing may be performed to revalidate any devices previously invalidated or unusable. For example, assume at a first point in time the maximum storage capacity limit is 10 TB. The user may add 3 PDs each 10 TB. The driver 122 may allow the addition of such 3 PDs and may indicate the state of the foregoing 3 PDs as valid and usable/available for use in connection with subsequent storage provisioning requests. At a second point in time, a request may be received to provision storage for a 30 TB logical device. The provisioning services 106 may enforce the 10 TB maximum storage capacity limit (as per the license limit) and not allow provisioning the 30 TB logical device even though there is sufficient physical storage. Additionally, in at least one embodiment, the driver 122 may disallow adding additional storage capacity devices or PDs to the backend if the storage capacity of the single PD exceeds the allowable maximum storage capacity limit. Continuing with this example, assume a user now tries, at a third point in time, to add a 25 TB PD. The driver 122 may determine a state for the new 25 TB PD as invalid or unusable whereby the 25 TB PD is not allowed to be used in connection with storage provisioning operations. At a next fourth point in time, the license may be upgraded whereby the enforced maximum storage capacity limit is 30 TB. Responsive to this change in maximum storage capacity limit, the driver 122 may perform processing to examine the current state of PDs indicated as invalid or unusable such as with provisioning. The processing by the driver 122 may re-evaluate the state of the PDs in light of the new revised maximum storage capacity limit of 30 TB. In this case, the 25 TB PD has its state changed from invalid or unusable to valid and usable whereby the 25 TB PD may now be used in connection with provisioning storage for subsequent requests. In this manner, updates to a limit may generally trigger re-evaluation of a state of logical and/or physical entities where the state may indicate an error or invalid state prior to the limit update and the state may be revised after the limit update to a valid or non-error state. Once the maximum storage capacity limit is updated at the driver level 122, the foregoing re-evaluation may be triggered where the PD state change to a valid state is due to the increased maximum storage capacity limit. The user may be informed of the updated PD states via the user interface of the management application 103. For example in one embodiment, the admin layer 120 may poll the driver layer 122 for changes in state information, such as changes in PD state information, and accordingly provide such updated state information to the management application 103.

More generally, techniques herein may provide for upgrading the maximum storage capacity limit, or other system resource (e.g., number of processors or memory), without service disruption. Upon license installation, one or more new licensed limits may be passed to software components and new limits may be available for immediate use. License installation may trigger revalidation as described above (e.g., as triggered by license installation that upgrades the maximum storage capacity limit). To further illustrate in connection with other system resources limits besides storage capacity related limits, consider a VSA. Described above is an example where the license may specify a maximum storage capacity limit and determining one or more other dependent limits of other resources, such as minimum requirements for memory and processors, based on the licensed maximum storage capacity. As a variation, the license may specify a number of processors or an amount of memory allocated for use by the VSA. If the VSA has a license, for example, for a specified number of N processors (N being an positive integer), one or more other dependent limits may be dynamically determined for the VSA. For example, if the VSA has N processors as specified by the license, the VSA may also be required to have at least a minimum amount of memory and may have no more than a maximum storage capacity limit derived from, or based on the number of N processors and/or the minimum amount of required memory. In this case, the maximum storage capacity limit may be a dependent limit derived from (e.g., based on or calculated from) the specified number of N processors (as indicated by the license). Additionally the minimum amount of memory may be a dependent minimum amount of the memory resource required to be licensed by the VSA in order to support the specified number of N processors and up to the maximum storage capacity limit.

As a variation, the license may specify a maximum number of processors that is an upper bound or limit on the number of allowable processors that may be used with the VSA. In such a case, one or more other dependent limits may be determined based on the maximum number of processors, or maximum processor limit for the VSA. The one more dependent limits may include, for example, a maximum number of allowable logical devices and/or maximum limits of one or more other logical entities due to the maximum processor limit.

As a further variation, the license may specify a maximum amount of memory that is an upper bound or limit on the amount of memory that may be used with the VSA. In such a case, one or more other dependent limits may be determined based on the maximum amount of memory, or maximum memory limit for the VSA. The one more dependent limits may include, for example, a maximum number of allowable logical devices, a maximum amount of processors, and/or maximum limits of one or more other logical entities due to the maximum processor limit.

Generally, if the license specifies one or more limits (e.g., maximum and/or minimum limits) for one or more resources, one or more dependent limits may be dynamically derived from one of the license-specified limits. The dependent limits may include, for example, minimum and/or maximum dependent limits applicable to any of: another system resource, a logical entity in the data storage system and a physical entity in the data storage system.

In at least one embodiment as described herein, capacity based licensing allows licensing of storage capacity for a storage system or appliance (e.g., virtualized as a VSA or non-virtualized). Described herein are techniques that allow customers to upgrade their licensed storage capacity without service disruption. Upon capacity license installation, new licensed limit information may be passed to software components on the system and a new capacity limit, and any derived limits, are available for immediate use. Capacity license installation may also trigger revalidation of unused devices, such as unused PDs. Additionally, with a VSA, revalidation may also be performed with respect to an unused logical device (e.g., virtual device) visible to the VSA but which is unused by the VSA due to an invalid error state associated with device due to limits prior to the license installation or upgrade. Such revalidation may result in verifying that the invalid error state of the unused logical device is now removed due to the upgraded or revised limit, such as revised maximum storage capacity limit of the license upgrade. In this manner, all attached storage devices may be rescanned and processing performed to revalidate the state of such devices with respect to any limits revised by the license upgrade or installation. In this manner, the customer may, on a periodic basis, increase or decrease limits, such as those associated with capacity requirements.

Figure 3:
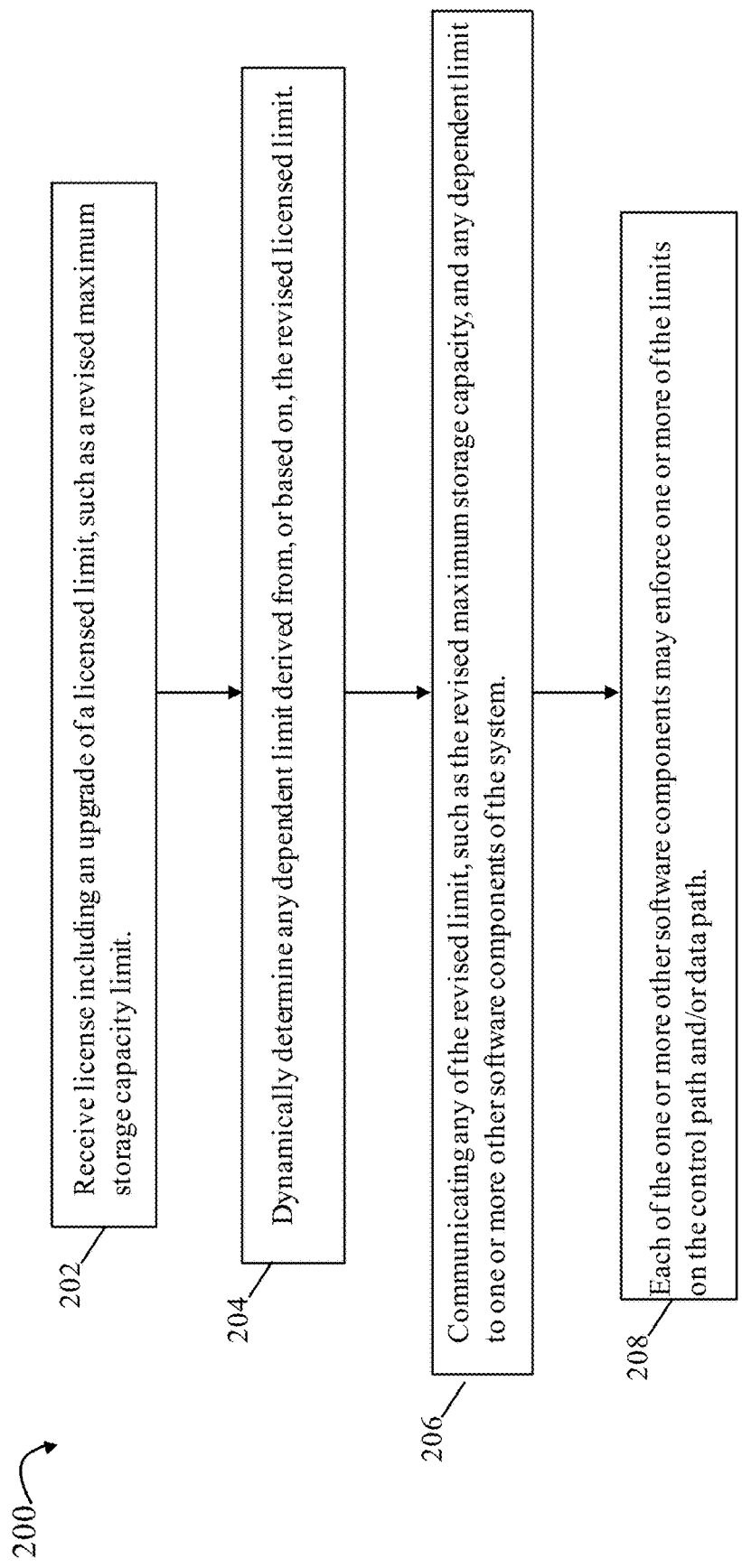
FIG. 3 is a flowchart of processing steps that may be performed in an embodiment in accordance with techniques herein.

Referring to FIG. 3, shown is a flowchart 200 summarizing processing described above that may be performed in an embodiment in accordance with techniques herein. At step 202, a license may be received that includes an upgrade (e.g., more generally adjustment/change) of a licensed limit, such as a revised maximum storage capacity limit. In step 204, processing may be performed to dynamically determine any dependent limit derived from, or based on, the revised licensed limit. In step 206, any one or more of the revised limit (e.g., such as the revised maximum storage capacity limit) and any dependent limit may be communicated to one or more other software components of the system. At step 208, each of the one or more other software components may enforce one or more of the limits on the control path and/or data path in connection with different events (e.g., management requests received, new devices added).

Consistent with other discussion herein, techniques herein may be generally used in connection with installing a license that is any of a new license, a license upgrade (e.g., with respect to a current license where the upgrade further extends licensed resources and/or capabilities relative to the current license), and a license downgrade (e.g., with respect to a current license where the downgrade reduces or limits licensed resources and/or capabilities relative to the current license).

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of licensing comprising:
   receiving, using a processor, a license that is a capacity-based license specifying a maximum limit of storage capacity, said maximum limit denoting a maximum allowable consumption amount of provisioned non-volatile physical storage;
   providing, using a processor, the maximum limit of storage capacity to one or more software components; and
   enforcing, using a processor and by the one or more software components, consumption of the maximum limit of storage capacity, wherein an actual amount of provisioned physical storage in a data storage system or data storage appliance is not allowed to exceed the maximum limit of storage capacity, wherein the maximum limit is a first maximum limit of non-volatile physical storage at a first point in time and wherein, at the first point in time, there is a first amount of unused storage capacity, that is in addition to the first maximum limit, on at least one non-volatile physical storage device currently in the data storage system or the data storage appliance, and wherein, at the first point in time, the first amount of unused storage capacity on the at least one non-volatile physical storage device currently in the data storage system or the data storage appliance has a current state of unusable or invalidated and is not made available at the first point in time for provisioning in accordance with the first maximum limit of the license, and wherein the method further includes:

at a second point in time subsequent to the first point in time, upgrading, using a processor, the license to a second maximum limit larger than the first maximum limit, said second maximum limit denoting a revised maximum allowable consumption amount of provisioned physical storage; and responsive to said upgrading, revalidating the first amount of unused storage capacity using a processor, wherein said revalidating includes updating the current state of the first amount of unused storage capacity of the at least one non-volatile physical storage device to usable or validated to indicate that the first amount is available for provisioning.

2. The method of claim 1, wherein the data storage system or the data storage appliance is virtualized whereby code portions of a control path and a data path are executed in a context of a virtual machine, and wherein the provisioned physical storage having the maximum limit is included in, or accessible to, a system providing a virtualized environment including the virtual machine.

3. The method of claim 1, wherein the method includes:
determining a set of one or more dependent limits, wherein each dependent limit of the set specifies an allowable amount for a physical entity or a logical entity, and said each dependent limit of the set is derived from the maximum limit of storage capacity;
communicating at least one of the maximum resource limit and a dependent limit from the set to at least a first of the one or more software components; and
enforcing, by the first software component, the at least one of the maximum resource limit and the dependent limit from the set.

4. The method of claim 3, wherein the set of one or more dependent limits includes one or more maximum allowable amounts for one or more of: maximum size of a file system, maximum size of a logical device, maximum number of snapshots, maximum number of logical devices, maximum size of a storage pool, maximum size of a RAID group, maximum size of a physical storage device, and a maximum amount of one of a plurality of storage tiers.

5. The method of claim 3, wherein the set of one or more dependent limits includes one or more minimum limits for one or more of: a minimum number of processors, a minimum amount of memory, and a minimum amount of one of a plurality of storage tiers.

6. The method of claim 3, wherein the first software component is included in a control path and the at least one of the maximum resource limit and the dependent limit from the set are enforced by the first software component in connection with servicing data storage system management requests.

7. The method of claim 6 wherein the first software component is used in connection with performing one or more of: a provisioning operation to provision storage for a logical entity in a data storage system, a data replication operation, a snapshot operation, or a file system operation.

8. The method of claim 3, wherein the first software component is included in a data path.

9. The method of claim 8, wherein the first software component is a device driver and the method includes:
determining, by the device driver, a first non-volatile storage device currently having a first state that is invalidated or unusable, said first non-volatile storage device having an associated first capacity that is not allowed to be used in connection with storage provisioning operations;
determining, by the device driver, that the first non-volatile storage device has a revised state that is validated or usable in accordance with the dependent limit from the set; and
responsive to determining that the revised state of the first non-volatile storage device is validated or usable, permitting the first non-volatile storage device to be used in connection with storage provisioning operations.

10. The method of claim 1, wherein the license is an upgrade license or a downgrade license with respect to a current license, the current license indicating a first maximum limit of storage capacity prior to the upgrade, wherein the first maximum limit is updated to the maximum limit of storage capacity as a revised maximum limit of storage capacity.

11. A system comprising:
one or more processors; and
one or more memories comprising code stored thereon that, when executed, performs a method of licensing comprising:
receiving, using a processor, a license that is a capacity-based license specifying a maximum limit of storage capacity, said maximum limit denoting a maximum allowable consumption amount of provisioned non-volatile physical storage;
providing, using a processor, the maximum limit of storage capacity to one or more software components; and
enforcing, using a processor and by the one or more software components, consumption of the maximum limit of storage capacity, wherein an actual amount of provisioned physical storage in a data storage system or data storage appliance is not allowed to exceed the maximum limit of storage capacity, wherein the maximum limit is a first maximum limit of non-volatile physical storage at a first point in time and wherein, at the first point in time, there is a first amount of unused storage capacity, that is in addition to the first maximum limit, on at least one non-volatile physical storage device currently in the data storage system or the data storage appliance, and wherein, at the first point in time, the first amount of unused storage capacity on the at least one non-volatile physical storage device currently in the data storage system or the data storage appliance has a current state of unusable or invalidated and is not made available at the first point in time for provisioning in accordance with the first maximum limit of the license, and wherein the method further includes:
at a second point in time subsequent to the first point in time, upgrading, using a processor, the license to a second maximum limit larger than the first maximum limit, said second maximum limit denoting a revised maximum allowable consumption amount of provisioned physical storage; and responsive to said upgrading, revalidating the first amount of unused storage capacity using a processor, wherein said revalidating includes updating the current state of the first amount of unused storage capacity of the at least one non-volatile physical storage device to usable or validated to indicate that the first amount is available for provisioning.

12. A non-transitory computer readable medium comprising code stored thereon that, when executed performs a method of licensing comprising:

receiving, using a processor, a license that is a capacity-based license specifying a maximum limit of storage capacity, said maximum limit denoting a maximum allowable consumption amount of provisioned non-volatile physical storage;

providing, using a processor, the maximum limit of storage capacity to one or more software components; and enforcing, using a processor and by the one or more software components, consumption of the maximum limit of storage capacity, wherein an actual amount of provisioned physical storage in a data storage system or data storage appliance is not allowed to exceed the maximum limit of storage capacity, wherein the maximum limit is a first maximum limit of non-volatile physical storage at a first point in time and wherein, at the first point in time, there is a first amount of unused storage capacity, that is in addition to the first maximum limit, on at least one non-volatile physical storage device currently in the data storage system or the data storage appliance, and wherein, at the first point in time, the first amount of unused storage capacity on the at least one non-volatile physical storage device currently in the data storage system or the data storage appliance has a current state of unusable or invalidated and is not made available at the first point in time for provisioning in accordance with the first maximum limit of the license, and wherein the method further includes:

at a second point in time subsequent to the first point in time, upgrading, using a processor, the license to a second maximum limit larger than the first maximum limit, said second maximum limit denoting a revised maximum allowable consumption amount of provisioned physical storage; and responsive to said upgrading, revalidating the first amount of unused storage capacity using a processor, wherein said revalidating includes updating the current state of the first amount of unused storage capacity of the at least one non-volatile physical storage device to usable or validated to indicate that the first amount is available for provisioning.

13. The non-transitory computer readable medium of claim 12, wherein the data storage system or the data storage appliance is virtualized whereby code portions of a control path and a data path are executed in a context of a virtual machine, and wherein the provisioned physical storage having the maximum limit is included in, or accessible to, a system providing a virtualized environment including the virtual machine.

14. The non-transitory computer readable medium of claim 12, wherein the method includes:

determining a set of one or more dependent limits, wherein each dependent limit of the set specifies an allowable amount for a physical entity or a logical entity, and said each dependent limit of the set is derived from the maximum limit of storage capacity;

communicating at least one of the maximum resource limit and a dependent limit from the set to at least a first of the one or more software components; and enforcing, by the first software component, the at least one of the maximum resource limit and the dependent limit from the set.

15. The non-transitory computer readable medium of claim 14, wherein the first software component is included in a control path and the at least one of the maximum resource limit and the dependent limit from the set are enforced by the first software component in connection with servicing data storage system management requests.

16. The non-transitory computer readable medium of claim 14, wherein the first software component is included in a data path.

* * * * *